United States Patent
Parkkinen et al.

(10) Patent No.: US 7,072,366 B2
(45) Date of Patent: Jul. 4, 2006

(54) METHOD FOR SCALABLE ENCODING OF MEDIA STREAMS, A SCALABLE ENCODER AND A TERMINAL

(75) Inventors: Teemu Parkkinen, Tampere (FI); Pasi Ojala, Lempäälä (FI)

(73) Assignee: Nokia Mobile Phones, Ltd., Espoo (FI)

( * ) Notice: Subject to any disclaimer, the term of this patent is extended or adjusted under 35 U.S.C. 154(b) by 874 days.

(21) Appl. No.: 09/904,486

(22) Filed: Jul. 13, 2001

(65) Prior Publication Data

US 2003/0206558 A1 Nov. 6, 2003

(30) Foreign Application Priority Data

Jul. 14, 2000 (FI) .................. 20001674

(51) Int. Cl.
*H04J 3/04* (2006.01)
*H04J 3/02* (2006.01)
*H04N 7/12* (2006.01)
*H04N 11/02* (2006.01)

(52) U.S. Cl. ............... 370/538; 370/235; 348/415; 348/401; 348/430

(58) Field of Classification Search ............... 348/415, 348/14.1, 401, 430; 375/240.08, 240.12, 375/240.13, 240.14, 240.15, 240.16; 370/230, 370/535, 536, 537, 538, 235, 236, 391
See application file for complete search history.

(56) References Cited

U.S. PATENT DOCUMENTS

| | | | |
|---|---|---|---|
| 5,550,580 A * | 8/1996 | Zhou | 348/14.1 |
| 5,742,343 A * | 4/1998 | Haskell et al. | 375/240.15 |
| 5,978,762 A | 11/1999 | Smyth et al. | 704/229 |

(Continued)

FOREIGN PATENT DOCUMENTS

EP 0634871 1/1995

(Continued)

OTHER PUBLICATIONS

Wang L et al: "Multi-program video coding 14 with joint rate control" Global Telecommunications Conference, 1996. Communications: The Key to Global Prosperity London, UK Nov. 18-22, 1996, New York, NY, USA, IEEE, US, Nov. 18, 1996, pp. 1516-1520.

(Continued)

*Primary Examiner*—Hanh Nguyen
(74) *Attorney, Agent, or Firm*—Perman & Green, LLP (57) ABSTRACT

A scalable encoder (100) for encoding a media signal is described. It comprises first encoding means (210) for producing a first data stream (102), which is a core data stream relating to the media signal (101), having a first bit-rate; second encoding means (230) for producing a second data stream (103), which comprises a set of enhancement data streams relating to the media signal, having a second bit-rate; and a multiplexer (110) for combining at least the first data stream and the second data stream into a third data stream (104). The scalable encoder it further comprises control means (420, 421, 422), which is arranged to receive control information (401), to determine a target combination of the first data stream and the second data stream in the third data stream according to the control information and to adjust the combination of the first data stream and the second data stream in the third data stream by affecting the first and the second bit-rates. A multimedia terminal having a scalable encoder and a method for encoding data are also presented.

35 Claims, 7 Drawing Sheets

U.S. PATENT DOCUMENTS 6,275,531 B1 * 8/2001 Li .................. 375/240.12
6,704,281 B1 * 3/2004 Hourunranta et al. ....... 370/230

FOREIGN PATENT DOCUMENTS

| EP | 0771119 | 5/1997 |
| EP | 0901289 A2 | 3/1999 |
| WO | WO 00/41483 | 7/2000 |

OTHER PUBLICATIONS

Japanese Patent document No. JP 10022960—English translation of the abstract.
Japanese Patent document No. JP 2000183751—English translation of the abstract.

* cited by examiner

METHOD FOR SCALABLE ENCODING OF MEDIA STREAMS, A SCALABLE ENCODER AND A TERMINAL

The invention relates in general to encoding of media streams. In particular the invention relates to scalable encoding methods and to scalable encoders.

In general, media streams are encoded, in other words compressed, before they are, for example, transmitted over a communication network or stored for further use. A media stream may be, for example, a video clip, which is a sequence of video frames, or an audio clip, which is typically digitized speech or music. In a multimedia application, for example, several media streams can be transmitted simultaneously.

Using a suitable decoder it is possible to produce from an encoded media stream a decoded media stream that is similar to, or exactly the same, as the original media stream, which was encoded. If the decoded media stream is the same as the original, the encoding is lossless. Most encoding methods cause losses to the encoded media stream.

The term scalability refers to encoding a media stream into a compressed stream, which can be decoded at different data rates. Typically part of the encoded data stream is a core data stream, decoding of which produces a decoded media stream having a perceived quality, which is worse than the perceived quality of the original media stream. The encoded data stream further comprises other enhancement data streams, and if these are used in the decoding process in addition to the core data stream, the perceived quality of the decoded media stream is enhanced. Because a scalable multimedia stream has these core and enhancement streams, it can be manipulated relatively easily while it is compressed so that it can be streamed over channels with different bandwidths and still be decoded and, furthermore, played back in real-time.

Scalability is a desirable property for heterogeneous and error prone environments. It is desirable in order to counter limitations such as constraints on transmission bit rate, network throughput, and decoder complexity. In multicast or broadcast transmission, for example, scalable encoding allows the various receivers to receive data at different data rates or to decode the transmitted encoded data stream with different decoders, which have a common core decoder. Furthermore, scalability can be used to improve error resilience in a transport system where scalable encoding is combined with transport prioritisation. Here the term transport prioritisation refers to various mechanisms to provide different qualities of service in transport, including unequal error protection, to provide different channels having different error/loss rates. Depending on their nature, data are assigned differently, for example, the encoded core data stream may be delivered through a channel with a high degree of error protection, and the enhancement data streams may be transmitted through more error-prone channels.

Figure 1:
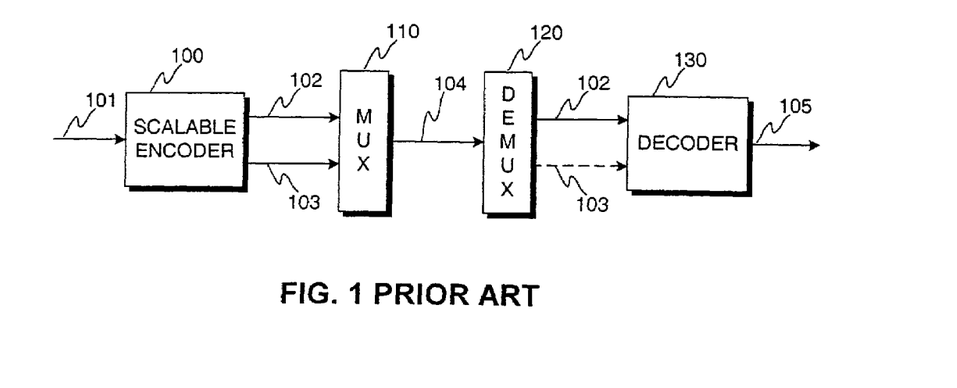
FIG. 1 shows schematically a scalable encoder and a corresponding decoder according to prior art.

FIG. 1 presents schematically a scalable encoder 100 and a corresponding decoder 130. The media stream 101 is input to the scalable encoder 100, which produces a core data stream 102 and an enhancement data stream 103. Typically these data streams are fed to a multiplexer 110, which produces a scalable encoded data stream 104. This multiplexed data stream is then, for example, transmitted further or stored for further use. During decoding the scalable encoded data stream 104 is demultiplexed in a demultiplexer 120 into a core data stream 102 and possible enhancement data stream(s) 103. It is possible, for example, that the enhancement data stream(s) is (are) not present in the received data stream 104, for example, due to limited transmission resources. The decoder 130 takes as inputs the core data stream 102 and the possible enhancement data stream(s) 103, and produces a decoded audio signal 105. The perceived quality of the decoded audio signal 105 typically depends on whether the enhancement data stream(s) 103 is (are) used in the decoding. It is also possible that a certain decoder cannot utilize particular enhancement data stream(s), but nevertheless it can decode the core data stream 102.

Figure 2:
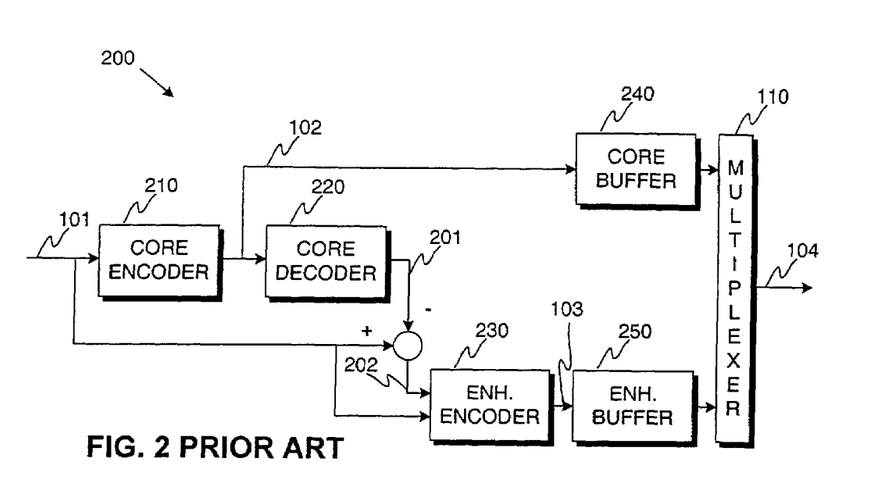
FIG. 2 shows schematically a scalable encoder having a speech encoder and an audio encoder according to prior art.

FIG. 2 shows schematically an example of a scalable audio encoder for encoding multimedia audio streams, which typically comprise speech and/or other audio signals. The scalable encoder 200 comprises a core encoder 210, which is, for example, specially designed for encoding speech. It may be, for example, 3GPP AMR (Adaptive Multi-Rate) speech encoder which comprises various codecs operating at nominal rates between 4.75–12.2 kbit/s. The scalable encoder 200 furthermore comprises an enhancement encoder 230, which is designed for encoding general audio streams. The enhancement encoder can, for example, consist of MPEG-4 AAC audio encoder. The core encoder 210 produces a core data stream 102 from an audio stream 101. The core data stream 102 is fed to a core decoder 220, which decodes the core data stream and produces a decoded core data stream 201. The difference stream 202 is the difference between the original audio stream 101 and the decoded core data stream 201, and it is fed to an enhancement encoder 230 together with the original audio stream 101. The original audio stream 101 is needed in enhancement encoder 230 typically for determining the psychoacoustic model for quantiser bit allocation. The enhancement encoder 230 produces an enhancement data stream 103. The core data stream 102 and the enhancement data stream 103 are multiplexed into a scalable encoded data stream 104 in multiplexer 110. FIG. 2 also shows core buffer 240 and enhancement buffer 250, which are the output buffers of the core and enhancement encoders.

Figure 3:
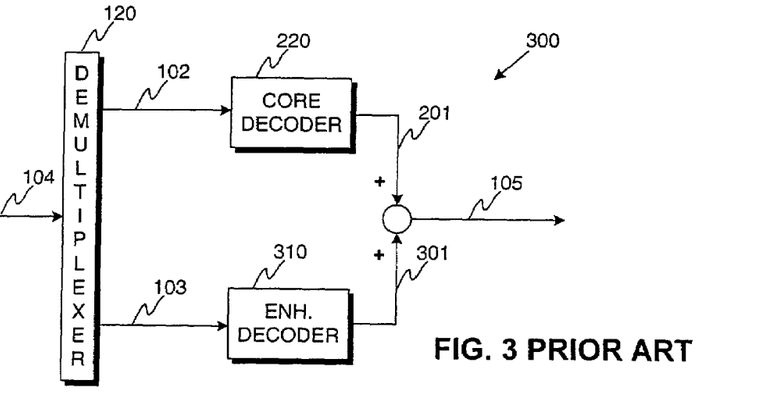
FIG. 3 shows schematically a prior-art decoder corresponding to the scalable encoder presented in FIG. 2.

FIG. 3 shows schematically a decoder 300 corresponding to the scalable encoder 200. The scalable encoded data stream 104 is demultiplexed into a core data stream 102, which is fed to a core decoder 220, and into a enhancement data stream 103, which is fed to an enhancement decoder 310. The core decoder 220 is typically similar to that present in the scalable encoder 200, and it produces a decoded core data stream 201. The enhancement decoder 310 produces a decoded enhancement data stream 301, which is combined with the decoded core data stream 201. The result is a decoded audio signal 105.

Typically, but not necessarily, the core speech encoder operates with lower bit rate and sampling frequency than the enhancement audio encoder. The sampling rates of the core and enhancement encoders may be the same or different, depending on what encoders are used. Usually the encoded enhancement data stream improves the perceived quality of the synthesized signal by adding the higher bandwidth signal components.

In scalable audio multimedia encoders the core speech encoder typically operates at constant bit rate, possibly utilising voice activity detection (VAD) and discontinuous transmission (DTX). The enhancement layer encoder, on the other hand, typically operates at a variable rate. Target bit-rates for the core and enhancement encoders are typically adjusted independently based on the transmission rate of the transmission channel, where the transmission rate is typically a nominal transmission rate. To be able to transmit the scalable encoded data stream, the bit rate of this data stream should, of course, on average be less than the available transmission rate.

Even though encoding algorithms effectively compress multimedia data, the limiting factor of the process, especially in terminals that operate over a radio interface, is transmission capacity, and therefore optimization of the use of this limited resource is very important. Generally, scalable multimedia encoding suffers from a worse compression efficiency than non-scalable encoding. In other words, a multimedia clip encoded as a scalable multimedia clip with all enhancement layers requires greater bandwidth than if it had been encoded as a non-scalable single-layer clip with an equivalent perceived quality. Because of its numerous advantages, the use of scalable encoding is highly desirable and thus it would be advantageous if a method allowing more efficient use of available transmission capacity could be implemented.

The core and enhancement data to be transmitted is temporarily stored in a multiplexer buffer, from where data chunks to be transmitted are extracted, for example, periodically. Typically the oldest data is extracted from the multiplexer buffer, and the ratio of the bit-rates of the core and enhancement data stream determines the ratio of the core and enhancement data streams in the transmitted data flow. In this case it is possible, for example, that a variable rate audio encoder may produce such a large burst of data, that the transmission of this data burst causes delay jitter in the transmission of the core speech data. Alternatively, it is possible to priorize the core (speech) data so that the enhancement data stream is transmitted using transmission capacity that is not used to transmit the core data stream. In this way it is possible to guarantee better that the core data stream is transmitted properly.

The available space in the multiplexer buffer is determined by the bit-rates of the core and enhancement data streams, as data is inserted to the multiplexer buffer at an overall bit-rate equivalent to the sum of the core and enhancement data bit-rates, and by the transmission bit-rate, at which data is extracted from the multiplexer buffer. The multiplexer buffer has a certain size. Typically, at least one of the core and enhancement data steams has a variable rate, and therefore it is possible that a data burst fills the remaining multiplexer buffer space, or even cannot be stored entirely in the buffer. This situation is called a multiplexer buffer overflow. Dynamic changes in the instantaneous transmission rate are another example of possible cause of a multiplexer buffer overflow. If the transmission rate decreases for a certain time, data is extracted from the multiplexer buffer at a smaller rate for a while, and the occupancy of the multiplexer buffer increases, possibly leading to a multiplexer buffer overflow. In a situation like this, if there is further a data burst, the risk of a multiplexer buffer overflows increases further. It is possible to try to overcome the multiplexer buffer overflow problem using a larger multiplexer buffer, but this typically results in increased transmission delays. Furthermore, a large buffer is an inefficient way to solve the problem, as for most of the time the extra space is not required.

An object of the invention is to provide a versatile method for scalable encoding of a multimedia data stream, a scalable encoder and a multimedia terminal comprising a scalable encoder. A further object of the invention is to provide a scalable encoding method, scalable encoder and multimedia terminal having a scalable encoder, where risk of multiplexer buffer overflow can be significantly reduced. A further object is to provide a scalable encoding method, scalable encoder and multimedia terminal having a scalable encoder, where the scalable encoded data stream can be adjusted to meet various and possibly dynamically changing circumstances.

These and further objects of the invention are achieved by determining a ratio of target bit-rates for the core data stream and enhancement data stream and, as long as the transmission rate allows, adjusting the core data stream and the enhancement data stream in such a way that the ratio is substantially maintained.

A scalable encoder according to the invention is an encoder for encoding a media signal, said encoder comprising first encoding means for producing a first data stream, which is a core data stream relating to the media signal, having a first bit-rate, second encoding means for producing a second data stream, which comprises a set of enhancement data streams relating to the media signal, having a second bit-rate, a multiplexer for combining at least the first data stream and the second data stream into a third data stream, and control means, which is arranged to receive control information, to determine a target combination of the first data stream and the second data stream in the third data stream according to the control information and to adjust the combination of the first data stream and the second data stream in the third data stream by affecting the first and the second bit-rates.

A multimedia terminal according to the invention comprises a scalable encoder having first encoding means for producing a first data stream, which is a core data stream relating to the media signal, having a first bit-rate; second encoding means for producing a second data stream, which comprises a set of enhancement data streams relating to the media stream, having a second bit-rate; a multiplexer for combining at least the first data stream and the second data stream into a third data stream; and a control unit, which is arranged to receive control information, to determine a target combination of the first data stream and the second data stream in the third data stream according to the control information and to adjust the combination of the first data stream and the second data stream in the third data stream by affecting the first and the second bit-rates.

The invention relates also to a method for scalable encoding a media signal, which method comprises the steps of:

encoding the media signal into a first data stream, which is a core data stream corresponding to the media signal, having a first bit rate, encoding the media signal into a second data stream, which comprises a set of enhancement data streams corresponding to the media signal, having a second bit rate, multiplexing at least the first data stream and the second data stream into a third data stream, receiving control information, determining a target combination of the first data stream and the second data stream in the third data stream according to the control information, and adjusting the combination of the first data stream and the second data stream in the third data stream by affecting the first and the second bit-rates.

Here the term control information refers to information that is used in determining a target combination of the core data stream and enhancement data stream in the combined encoded data stream. Possible changes in the transmission rate and in the bit-rates of the core (first) and enhancement (second) data streams cause the occupancy of the multiplexer buffer to change. Therefore, information indicating the occupancy of the multiplexer buffer is an example of control information that may be used to provide a controlling feedback for determining the target bit-rates for the core and enhancement streams. Other examples of control information are, for example, user preferences relating to the combination of the core and enhancement data streams. The user preference information can originate from the transmitting and/or receiving user/terminal.

One of the main ideas in the invention is to determine a suitable combination for the core data stream and enhancement data stream jointly, instead of adjusting the target bit rates for these data streams independently. By controlling data streams using, for example, the multiplexer buffer occupancy information, the operation of the scalable encoders can be adjusted to the current purpose and, for example, to the condition of the transmission channel. Also the limited transmission capacity is more optimally used compared with a solution, where only the bit rate of the enhancement data stream is adjusted or where the bit rates of the core and enhancement data streams are adjusted independently.

Furthermore, when the bit-rates of both the core and enhancement data stream are adjusted jointly, it is possible to sustain a given ratio between the bit-rates. On the other hand if, for example, a user prefers speech to audio, it is possible to reduce the bit rate of an audio stream significantly and to try to sustain the perceived quality of transmitted speech. Versatile scalable encoding is thus possible by applying the invention. When encoding a media stream according to the invention, the bit rate of either or both of the core or enhancement data streams can be adjusted, and therefore the available transmission capacity can be more exhaustively used. Due to this joint control of core and enhancement data streams, the danger of multiplexer buffer overflow will also decrease, and consequently the total buffer space can, in an optimal case, be reduced, thereby also decreasing the transmission delay. In a situation, where there is only a limited amount of space available in the multiplexer buffer, it is possible according to the invention, for example, to reduce the bit-rate of both the core and enhancement data streams, instead of only reducing the bit-rate of the enhancement data stream.

A scalable encoder may produce a set of enhancement data streams. In this case, the core data stream and the enhancement data streams forming the set of enhancement data streams are multiplexed into the scalable encoded data stream. The number of enhancement data streams may be adjusted, for example, when the occupancy of a multiplexer buffer is above a certain threshold and/or the bit-rate allocated to each enhancement data may be adjusted. The bit-rates allocated for each enhancement data stream can be adjusted independently or, for example, the bit-rate allocated for each enhancement data stream may be adjusted in a similar way.

A scalable encoder according to the invention may be part of an encoding arrangement, where, for example, both audio signals and video signals are encoded. Such an encoding arrangement may comprise, for example, two scalable encoders (one for audio signal and one for video signal) or one non-scalable encoder and one scalable encoder.

The appended dependent claims describe some preferred embodiments of the invention.

The invention is described in more detail below with reference to preferred embodiments of the invention and to the enclosed figures, in which.

FIGS. 1–3 were discussed in connection with the description of prior art scalable encoders.

In the detailed description of the invention, one enhancement data stream is discussed as an example. It is possible that a scalable encoder according the invention produces a set of enhancement data streams comprising more than one enhancement data stream.

Figure 4:
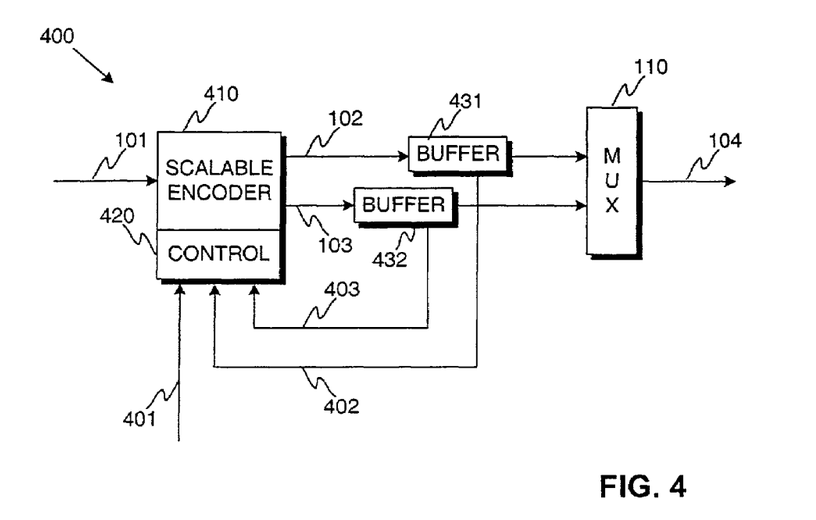
FIG. 4 shows schematically a scalable encoder according to a first preferred embodiment of the invention.

FIG. 4 shows schematically a scalable encoder arrangement 400 according to a first preferred embodiment of the invention. It comprises a scalable encoder 410 and a control unit 420, which is arranged to adjust the bit rates of the core data stream 102 and the enhancement data stream 103. The control unit 420 receives control information 401, which it uses in determining a target combination of the core and enhancement data streams. Usually suitable target bit-rates, which can be target average bit-rates and/or target maximum bit-rates, are determined for the core and enhancement data streams. It is possible that the control unit 420, in addition to determining the target combination, also monitors the current bit rates of the core data stream and enhancement data stream 402, 403 and, for example, adjusts the encoder so that the selected target bit rate is achieved. The current bit rates are typically measured using the output buffers 431, 432 of the scalable encoder 410.

Figure 5:
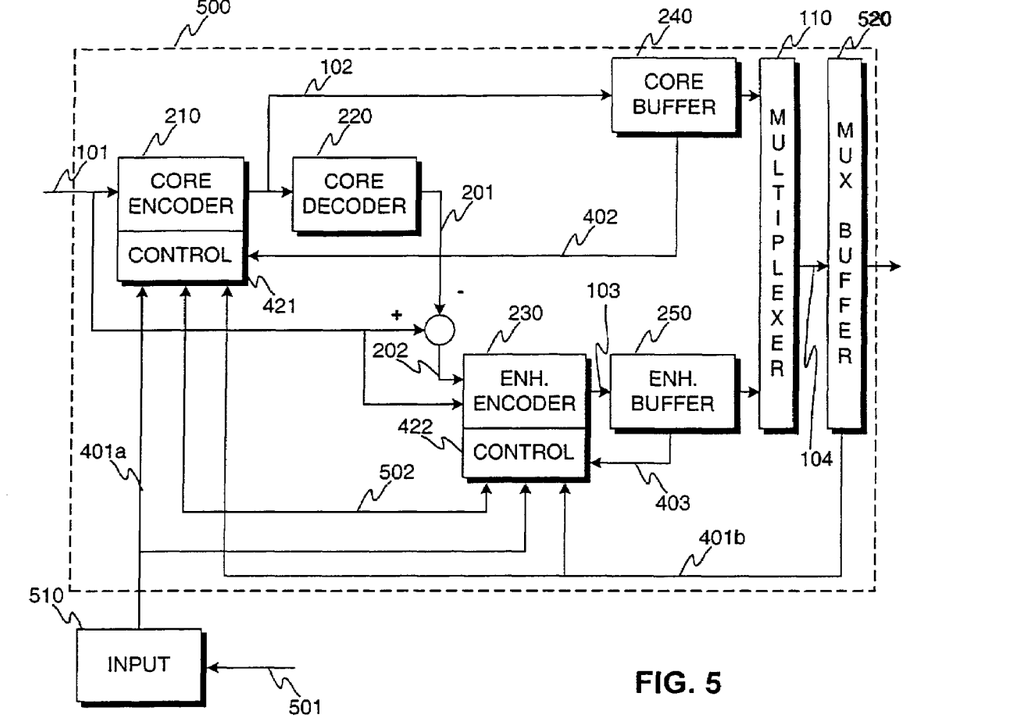
FIG. 5 shows schematically a scalable encoder according to a second preferred embodiment of the invention.

FIG. 5 shows schematically a scalable encoder arrangement 500 according to a second preferred embodiment of the invention. This scalable encoder 500 comprises, as an example, a speech core encoder 210 and an audio enhancement encoder 230. The speech encoder and the audio encoder are typically similar to the encoders presented in connection with FIG. 2. The speech encoder may be, for example, a variable rate speech encoder, or a multi-rate speech encoder having a certain set of available encoding algorithms producing encoded speech at different nominal bit-rates. A variable rate speech encoder may be, for example a variable rate speech encoder as described in the document "Toll quality variable rate speech codec", Pasi Ojala, Proceedings of IEEE International Conference on Acoustics, Speech and Signal Processing, Munich, Germany, April 1997. A multi-rate speech may be, for example, a 3GPP AMR (Adaptive Multi-Rate) speech encoder.

In FIG. 5 two possible sources of control information are shown as examples. It is possible to use information 401b about the occupancy level of the multiplexer buffer 520 as control information. For example, when the transmission capacity of a transmission channel is dynamically changing or if the bit-rate of the enhancement data stream increases suddenly for a certain period of time, there may a danger of multiplexer buffer overflow, as discussed above in connection with the prior art description. According to the invention, when there is a danger of multiplexer buffer overflow, it is possible to reduce the target bit rate of the core data stream and/or the enhancement data stream to reduce the bit-rate of the combined data stream.

FIG. 5 also presents input element 510 for receiving preference information 501. The input element is typically a part of a multimedia terminal, of which the encoder 500 is a part. The preference information 501 provided to the input element 510 can originate from many different sources. The input can come from the user of the transmitting terminal, wherein the input element is typically part of the user interface of the multimedia terminal. The term user interface means, for example, a combination of a keyboard, a screen and appropriate software to transform the commands given by the user into a formatted preference indication. The preference in such a solution can also be adjusted e.g. with the help of a slide switch, where positioning the switch at one end of its scale means full preference for high quality voice and positioning the switch at the opposite end means full preference for high quality audio, and positioning the switch somewhere in between indicates the direction of trade-off between speech and audio. The input can also come from some external source, e.g. from the receiving user, wherein the input element is a part of the receiving functions of the multimedia terminal. The control input can be received, for example, as part of call control or as in-band signalling. The information can be provided at the beginning of communication of updated during communication. Furthermore, it is possible that certain preset values indicating appropriate combinations of core and enhancement data streams are stored in the multimedia terminal or in the encoder itself. These preset values can be, for example, dependent on the transmission channel bit-rate.

The preference information 501 indicates the preferred combination of the core and enhancement data streams 102, 103 in the scalable encoded data stream 104, and the possible options comprise any combination from full subsidiarity (0%) to full preference (100%) to one bit-stream, including any trade-off combination therebetween. The preference information 501 is transformed into control information 401a, and this control information 401a is input to the speech and audio bit-rate control units 421, 422. The speech bit-rate control unit 421 and the audio bit-rate control unit 422 is arranged to adjust the target bit-rates of encoding according to the preferred proportions set by the preference indication. After this the encoders 210, 230 are arranged to operate on said target bit-rate levels. Typically, if the preference is on high speech quality, the control information 401a causes the control units 421, 422 to set a relatively high target bit-rate for the core encoder and a relatively low target bit-rate and for the audio encoder. The target bit rates can be average bit-rates and/or maximum bit-rates. The ways in which an encoder is arranged to adjust the bit-rate are discussed in more detail below.

In a situation where it is expected that a terminal receiving the scalable encoded data stream is able to decode only the core data stream, it is preferable for the core data stream to have a higher bit-rate than the enhancement data stream. It is possible, for example, that before the actual encoding of data begins the terminals involved in a multimedia session inform each other of their encoding and decoding capabilities. This information can be used as control information. It is reasonable to give higher priority to the control information received from a receiving terminal/user than that coming from the transmitting terminal/user.

As FIG. 5 shows, the current bit rate 402 of the core data stream or the current bit rate 403 of the enhancement data stream can be monitored and used in adjusting the core and enhancement encoders. Furthermore, arrow 502 in FIG. 5 illustrates possible information exchange between the control units 421 and 422. The joint control of the target bit-rates for core and enhancement data streams can be implemented as separate control units, which communicate with each other, or alternatively as separate control units with a common logic enabling joint control of the bit-rates. Furthermore, it is possible to have a single control unit, which selects the target bit-rates and monitors the current bit-rates of both the core encoder and the enhancement encoder.

An encoder according to the invention can be implemented in hardware, in software, or as a combination of hardware and software. It may be, for example, a computer program comprising computer program code means adapted to perform necessary steps (for example, the steps of a method according to the invention) when said program is run on a computer. The computer program may be embodied on a computer readable medium.

Figure 6:
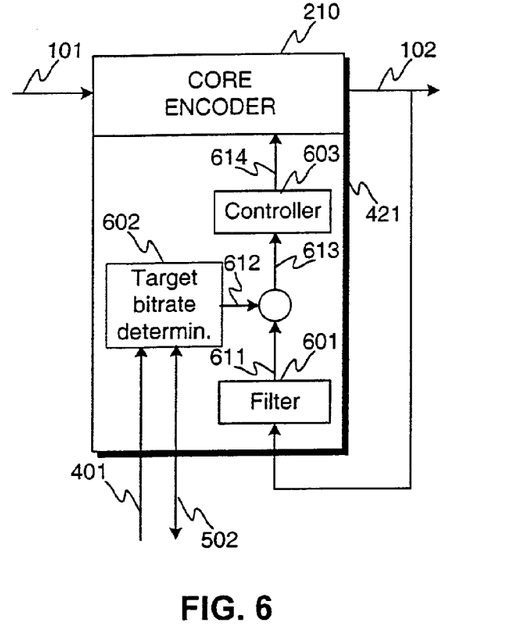
FIG. 6 shows schematically a control unit relating to a core encoder according to a third preferred embodiment of the invention.

FIG. 6 shows schematically a control unit 421 relating to a variable rate core encoder 210 according to a third preferred embodiment of the invention. The variable rate encoder may be, for example, a variable rate speech encoder. For control purposes, the bit-rate of the core data stream 102 from the core encoder 210 is monitored and fed to a feed-back filter 601, where it is averaged to smoothen short term variations in the bit-rate. The estimated average bit-rate 611 obtained in this way is subtracted from the target bit-rate 612 of the core encoder 210 to derive an error signal 613 that is fed to a controller 603 that generates a control signal 614 for the core encoder 210. The encoding algorithm used in the speech encoder is adjusted according to the control signal received from the controller 614. The details of the adjustment depend on the encoding algorithm: typically, for example, the quantization of the coefficients representing the original media signal is adjusted. In the controller 603, any control algorithm or logic can be used. For example, PI (Proportional Integral) type of control, generally known to a person skilled in the art, is possible. The target bit-rate 612 is determined in a target bit rate determination unit 602, which is also part of the control unit 421. The control information 401 affects the determination of the target bit-rate, which is typically determined jointly with the target bit-rate of the enhancement encoder 230. Arrow 502 in FIG. 6 illustrates the exchange of information between these control units.

The function of the control loop is substantially to drive the estimated average bit-rate 611 to follow the given target bit-rate 612, and the input signal 101 can be considered as a disturbance to the control-loop. For example in the case of a source controlled variable-rate speech encoder, the bit-rate is selected using adaptive thresholds. The control signal 614 from the controller 603 can be used as a tuning factor for the selection of an adaptive threshold for the speech encoder 210. More detailed description of the embodied use of adaptive thresholds for controlling the bit-rate can be found e.g. in the document "Toll quality variable-rate speech codec", Pasi Ojala, Proceedings of IEEE International Conference on Acoustics, Speech and Signal Processing; Munich, Germany, April 1997. In addition to the control of the average bit-rate, the maximum bit-rate of the speech encoder can also be controlled by limiting the use of codebooks requiring the highest bit-rates. Applying control of the average bit-rate and for the maximum bit-rate of the encoder, the bit-rate of the encoded core data stream 102 can be targeted to a given level.

Figure 7:
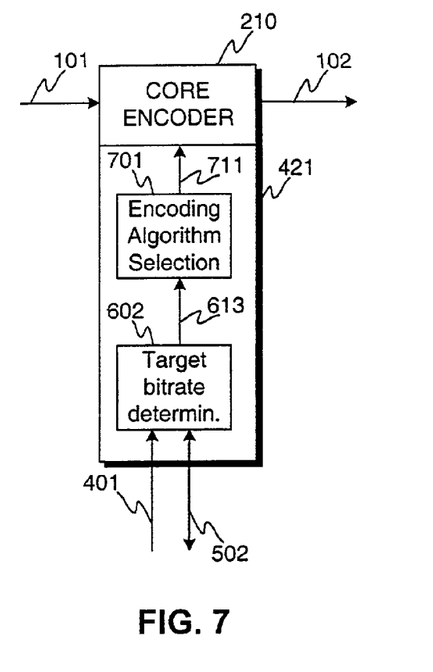
FIG. 7 shows schematically a control unit relating to a core encoder according to a fourth preferred embodiment of the invention.

FIG. 7 shows schematically a control unit 421 relating to a core encoder 210 according to a fourth preferred embodiment of the invention. Here the core encoder 210 is a multi-rate encoder, which comprises a set of separate encoding algorithms, each producing encoded speech at a certain bit rate. The control information 401 is fed to a target bit-rate determination unit 602, where the target bit rate for the core encoder 210 is determined. It is determined jointly with the target bit rate for the enhancement data stream. Arrow 502 in FIG. 7 illustrates the exchange of information between the core control unit 421 and the enhancement control unit 422. The determined target bit-rate 612 is fed to an encoding mode selection unit 701, which selects a suitable encoding algorithm and transmits control signal 711 indicating the selected encoding algorithm to the core encoder 210.

Figure 8:
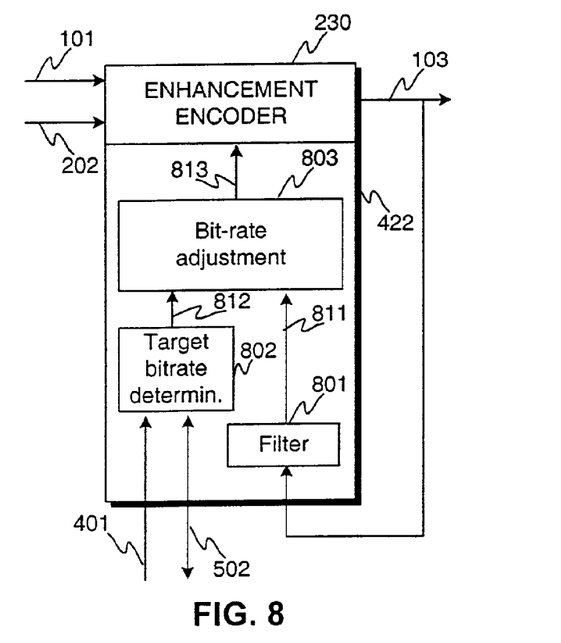
FIG. 8 shows schematically a control unit relating to an enhancement encoder according to a fifth preferred embodiment of the invention.

FIG. 8 shows schematically a control unit 422 relating to an enhancement encoder 230 according to a fifth preferred embodiment of the invention. The enhancement encoder is typically a variable rate encoder. It is possible, for example, to monitor the average bit-rate of the enhancement data stream 103 using a filter 801, which smoothens short-term variations in the bit-rate and produces an estimated average bit-rate 811. A target bit-rate 812, which is selected in a target bit-rate selection unit 802 jointly with the target bit-rate for a core encoder (see arrow 502 in FIG. 8) and using control information 401, is fed together with the average bit-rate 811 to a bit-rate adjustment unit 803. Typically the output bit-rate of a variable rate audio encoder is adjusted, for example, by selecting a suitable quantization accuracy for the frequency domain transform coefficients, which the audio encoder produces. It is also possible to adjust the output bit rate by adjusting the audio bandwidth. The term audio bandwidth means the frequency range of the audio signal to be encoded. It can be, for example 0–12 kHz or 0–16 kHz. By increasing the audio bandwidth, the number of frequency domain coefficients required to represent the audio signal increases.

Figure 9:
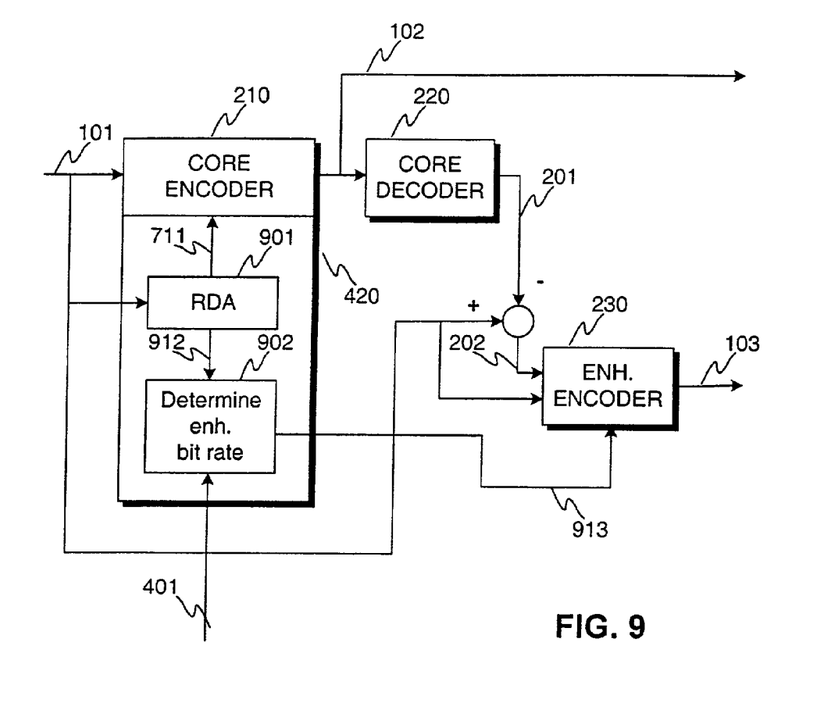
FIG. 9 shows schematically a control unit relating to a core encoder and an enhancement encoder according to a sixth preferred embodiment of the invention.

FIG. 9 shows schematically a control unit 420 relating to a core encoder 210 and to an enhancement encoder 230 according to a sixth preferred embodiment of the invention. Here the core encoder 210 comprises a set of available encoding algorithms producing encoded speech at various bit rates. The control unit 420 comprises a rate determination algorithm (RDA) unit 901, where the content of the signal 101 is analyzed. The rate determination algorithm described here analyses the speech content of an audio signal, but it is possible to use any signal content analyzer. The rate determination algorithm unit 901 selects the encoding algorithm, which produces an encoded enhancement data stream having the smallest bit-rate while still providing adequate audio quality. It is possible, for example, to use long-term periodicity and prediction gains as selection factors. Long-term periodicity refers to fundamental frequencies present in the signal; periodic signals give high long-term prediction gain and typically indicate voiced sounds. To achieve good quality, accurate coding of the periodic components is required. This typically means the selection of an encoding algorithm producing encoded speech at a relatively high bit-rate. On the other hand, low long-term prediction gain typically indicates non-voiced sound, and long-term coding is typically not required. This means that a lower bit-rate is required to accurately represent the signal to be encoded. Short-term prediction is another technique commonly used in the encoding of audio data, specifically speech data, and it typically involves modeling of the signal spectrum (frequency spectrum) using linear prediction coding (LPC). A good LPC fit usually indicates that the signal contains speech and thus requires a high core bit rate to achieve good speech quality.

Furthermore, it is possible, for example, to use the signal-to-noise ratio (SNR) of the decoded core data stream as a core encoding algorithm selection factor. For example, all encoding algorithms may be run in parallel and the one producing the best SNR is selected. In addition, it is possible to use signal energy and frequency content in selecting a suitable encoding algorithm or target bit rate for the core encoder.

Typically the bit-rates of the core and enhancement data stream are adjusted independently of each other once the target bit-rates for the data streams have been determined jointly. Although the target bit-rates are determined jointly, it is possible to change the target bit-rate (812) of an enhancement data stream, for example, more often than that (612) of the core data stream. This may be advantageous, for example, when the enhancement encoder is a variable rate-encoder and the core encoder is a multi-rate encoder.

Figure 10:
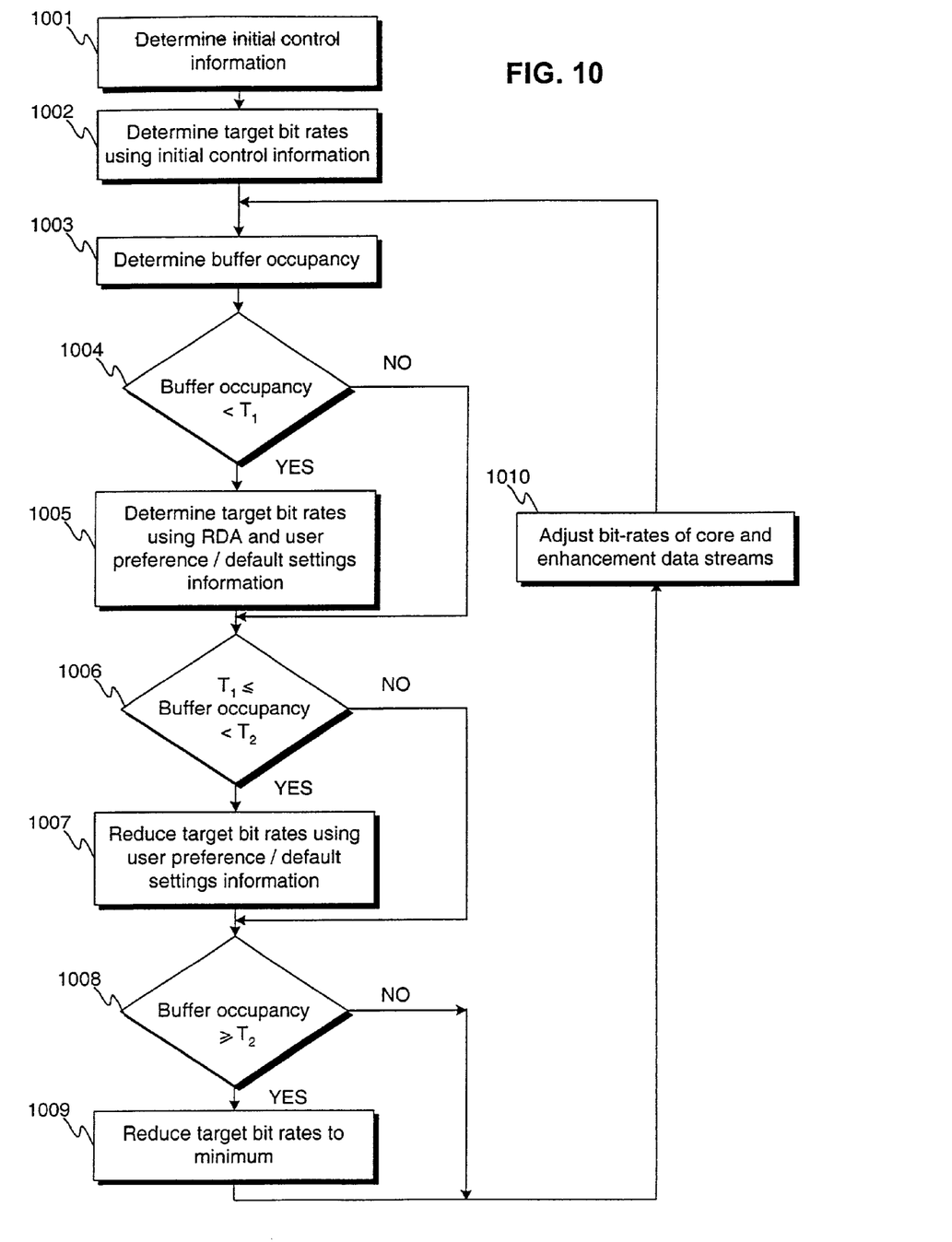
FIG. 10 shows a flowchart corresponding to a method according to the invention.

FIG. 10 shows, as an example, a flowchart corresponding to a method according to the invention, in which the target bit-rate of a core encoder and the target bit-rate of an enhancement encoder are determined jointly using control information. Step 1001 is performed when encoding is begun to determine initial control information. The initial control information may be, for example, a preset default setting or it may originate, for example, from the transmitting user/terminal or from the receiving user/terminal. In step 1002 the target combination of the core data stream and the enhancement data stream is determined according to the initial control information. Thereafter, during the encoding process, the loop formed by steps 1003–1010 is executed. In step 1003, the availability of multiplexer buffer space is determined. If there is enough available buffer space (for example, the buffer occupancy is less than a certain first threshold $T_1$ in step 1004), target bit-rates for the core and enhancement data streams are determined in step 1005 using, for example, RDA information and user preference information as control information. For example, it is possible to estimate the actual transmission rate from the buffer occupancy and the bit-rates of the core and enhancement data streams. The RDA determines a certain bit rate, for example, for the core bit stream, and as long as the transmission rate is probably large enough for transmitting a data stream having a core data stream, whose bit-rate is that determined by the RDA, and an enhancement data stream, whose bit-rate is determined by preference information indicating a ratio of the target bit-rates for the core and enhancement data streams, the bit-rates determined using RDA can be allowed. If the RDA suggests too large a bit-rate, then it is possible to sustain the preferred bit-rate ratio by reducing the bit-rates of the core and enhancement streams accordingly. If the RDA suggests such a low bit-rate for the core data stream that part of the available transmission capacity would be left unused assuming the given combination of the core and enhancement data streams, it is possible to select a higher target bit-rate for the core data stream and, respectively, for the enhancement data stream.

If the buffer occupancy is, for example, over the first threshold $T_1$ (indicating that the risk of multiplexer buffer overflow is increased) but below a second threshold $T_2$ (step 1006), the bit-rates of the core and/or enhancement data streams may be limited according to, for example the user preference information or default setting information, in step 1007 by adjusting the target bit-rates of the core and/or enhancement data streams. If the multiplexer buffer occupancy exceeds the second threshold $T_2$ (step 1008) indicating that the multiplexer buffer is subtantially full, the bit rates of the core and enhancement data streams are restricted further in step 1009. This may mean, for example, that the enhancement encoder is not used at all and, for example in the case of a multi-rate core encoder, the encoding algorithm producing a core data stream having the smallest bit rate is selected.

When the potential overflow situation has passed, the occupancy level of the buffer decreases. This means that at some point after the potential overflow situation the occupancy level of the multiplexer buffer is below $T_2$, and the target bit-rates for the core and enhancement data streams can be adjusted according to the preferred bit-rate ratio. Furthermore, when the occupancy level of the multiplexer buffer is below $T_1$, it may be possible to use a target bit-rate determined by RDA for the core data stream.

It is also possible that the user preference information or other control information is provided or updated during encoding process. In that case, the target combination of the core data stream and the enhancement data stream is determined according to the provided/updated control information in the loop comprising steps 1003–1009.

After the target bit-rates for the core and enhancement data streams are determined in step 1005 (or in step 1007 or 1009), the bit-rates of the core and enhancement data streams are adjusted in step 1010 according to the determined target bit-rates. In step 1010 the bit-rates can be adjusted using, for example, arrangements presented in FIGS. 7–9. Typically this adjustment of the bit-rates is a continuous activity, which goes on also during the execution of steps 1003–1009. The target bit-rates for the adjustment are updated (steps 1005, 1007, 1009), for example, every time information about the occupancy of a multiplexer buffer is received.

FIG. 10 does not show explicitly the receipt of the data to be encoded, the actual encoding or the multiplexing of the core and enhancement data streams into a combined data stream. These are, however, all typically carried out in a method according to the invention.

There are also scalable video encoders, which typically comprise base layer (core) encoding and enhancement layer encoding implemented in a single encoder. Thus FIG. 4 also schematically presents a typical scalable video encoder according to the invention. A video sequence consists of a series of still pictures, which are displayed consecutively, each frame separated from the other by a certain interval of time. Video compression/encoding methods are based on reducing redundant and perceptually irrelevant parts of video sequences. The redundancy in video sequences can be categorized into spatial, temporal and spectral redundancy. The term spatial redundancy refers to the correlation between neighboring pixels within an image. Temporal redundancy refers to the similarity between consecutive pictures in a video sequence. Reducing the temporal redundancy reduces the amount of data required to represent a particular image sequence and thus compresses the data. This can be achieved by generating motion compensation data, which describes the motion between the current and a previous (reference) picture. In effect, the current picture is predicted from the previous one. The term spectral redundancy refers to the correlation between the different color components of the same picture.

Scalable video encoding may use temporal scalability, signal-to-noise ratio scalability or spatial scalability. Temporal scalability provides a mechanism for enhancing perceptual quality by increasing the picture display rate. This is achieved by taking a pair of consecutive reference pictures and predicting additional pictures from either one or both of them. The additional predicted pictures can then be played in sequence between the two reference pictures. The additional predicted pictures are not used as reference pictures themselves, that is other pictures are never predicted from them or otherwise encoded using them. Thus, they can be discarded without impacting the picture quality of future pictures, and therefore they provide temporal scalability. Spatial scalability and SNR scalability are closely related, the only difference being the increased spatial resolution provided by spatial scalability. SNR scalability implies the creation of multi-rate bit streams. It enables the recovery of coding errors, or differences between an original picture and its reconstruction from the base layer data stream. This is achieved by using a finer quantizer to encode a difference picture in an enhancement layer. This additional information increases the SNR of the overall reproduced picture.

Spatial scalability allows for the creation of multi-resolution bit streams to meet varying display requirements and/or constraints. It is essentially the same as in SNR scalability except that a spatial enhancement layer attempts to recover the coding loss between an up-sampled version of the reconstructed reference layer picture and a higher resolution version of the original picture. For example, if the reference layer has a quarter common intermediate format (QCIF) resolution (176×144 pixels), and the enhancement layer has a common intermediate format (CIF) resolution (352×288 pixels), the reference layer picture must be scaled accordingly such that the enhancement layer picture can be predicted from it. The QCIF standard allows the resolution to be increased by a factor of two in the vertical direction only, the horizontal direction only, or both the vertical and horizontal directions for a single enhancement layer. Thus, there can be multiple enhancement layers, each increasing the picture resolution over that of the previous layer.

In scalable video encoders the enhancement data stream typically comprises additional predicted frames (temporal scalability) and/or additional information about the coefficients describing the original frame. In a scalable video encoder according to the invention, the accuracy of the base layer frame and the accuracy of the enhancement layer frame is typically adjusted by adjusting quantization of the coefficients or, in temporal scalability, also by adjusting the number of additional predicted frames.

Figure 11:
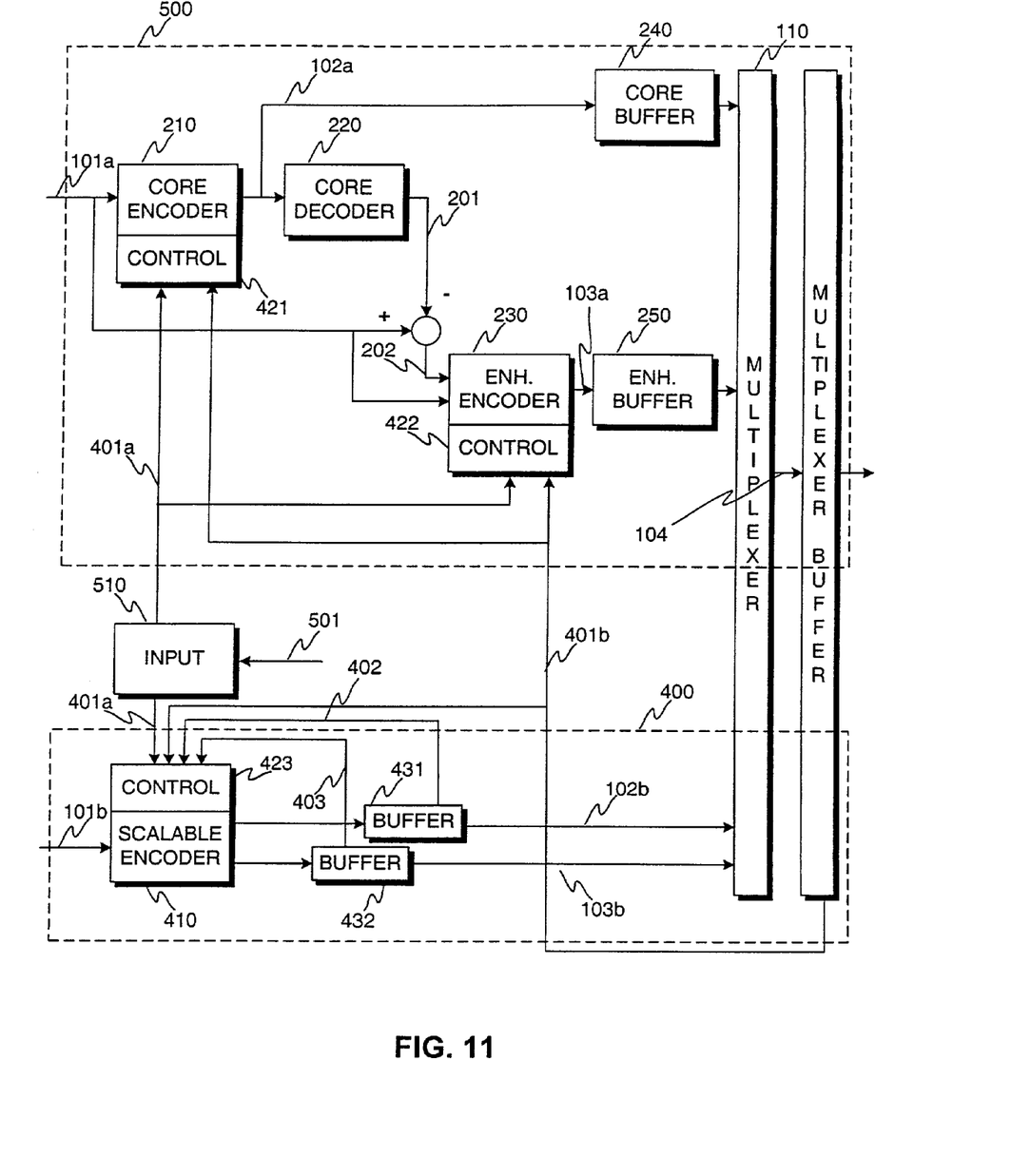
FIG. 11 shows schematically a scalable encoder for audio and video streams according to a seventh preferred embodiment of the invention.

FIG. 11 shows schematically an example of an arrangement comprising two scalable encoders, encoder 500 for encoding an audio signal 101*a* and encoder 400 for encoding a video signal 101*b*, according to a seventh preferred embodiment of the invention. In this embodiment, control information is delivered to control units 420, 421, 422 of both scalable encoders. The control information may indicate, for example, a user preference between audio and video streams and/or fine tuning preferences for the scalable audio encoder 500 and for the scalable video encoder 400.

Figure 12:
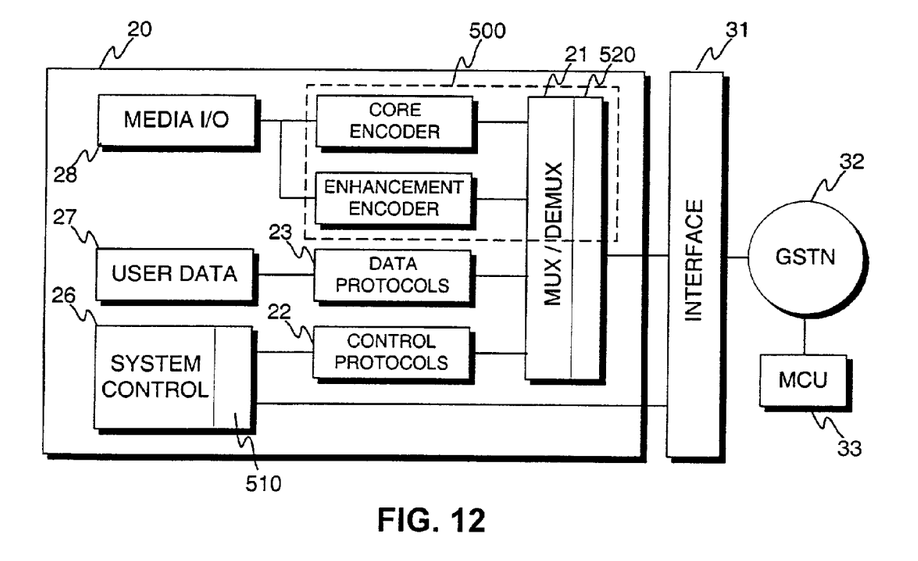
FIG. 12 shows schematically an H.324 multimedia terminal according to the invention.

FIG. 12 shows a functional block diagram of a multimedia communication terminal 20 according to the invention. As an example, the multimedia terminal 20 is an H.324 multimedia terminal. An H.324 compatible multimedia communication system, as shown in FIG. 12, consists of a terminal unit 20, an interface unit 31, a GSTN (General Switched Telephone Network) network 32, and a multipoint control unit (MCU) 33. H.324 implementations are not required to have each functional element. Mobile terminals may be implemented with any appropriate wireless interface as an interface unit 31 (as specified in H.324 Annex C). In this case the network is a PLMN (Public Land Mobile Network) rather than a GSTN.

The MCU 33 works as a bridge, that centrally directs the flow of information in the GSTN network 32 to allow communication among several terminal units. The interface unit 31 converts the multiplexed bit-stream into a signal that can be transmitted over the GSTN, and converts the received signal into a bit-stream that is sent to the multiplex/demultiplex protocol unit 21 of the terminal 20. The multiplex protocol multiplexes encoded media, data and control streams into a single bit-stream for transmission, and demultiplexes a received bit-stream into various media streams. In addition, it performs logical framing, sequence numbering, error detection, and error correction e.g. by means of retransmission, as appropriate to each media type. The control protocol 22 of the system control 26 provides end-to-end signaling for operation of the multimedia terminal, and signals all other end-to-end system functions. It provides for capability exchange, signaling of commands and indications, and messages to open and fully describe the content of logical channels. The data protocols 23 support data applications 27 such as electronic whiteboards, still image transfer, file exchange, database access, audiographics conferencing, remote device control, network protocols etc. The scalable encoder 500 according to the invention encodes the audio and/or video signal from the media I/O equipment 28 for transmission. The media I/O equipment typically comprises a microphone and a loudspeaker for the capture/reproduction of audio signals and a display and a digital camera for the capture/reproduction of video signals. The scalable encoder 500 typically receives information about the occupancy level of a multiplexer buffer 520 which is a part of the multiplexer unit 22. Typically there is also a corresponding decoder unit, but it is not shown in FIG. 12. The decoded media signal is presented to the user using the media I/O equipment. A multimedia terminal according to the invention comprises at least one scalable encoder according to the invention for encoding a signal from media I/O equipment. A multimedia terminal according to the invention may comprise a scalable encoder arrangement for encoding audio and video signals, as illustrated in detail by the example in FIG. 11.

It is also possible that in encoding and decoding algorithms, which do not correspond to each other, are used. In other words, it is possible to use one encoding algorithm in one direction of a bidirectional multimedia connection and a second encoding algorithm in the other directions. It is alternatively possible that a multimedia connection is unidirectional, as for example in multimedia streaming where a multimedia data stream is retrieved from a source resident in a network and is decoded and played back at a receiving multimedia terminal. In this case an encoder according to the invention would be located in the network.

Figure 13:
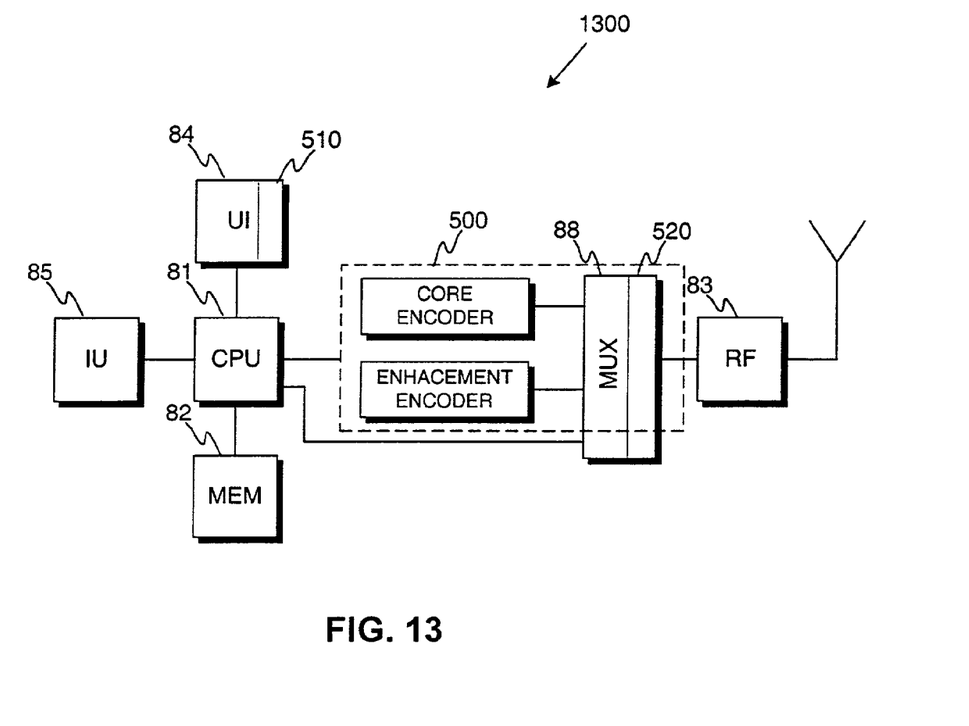
FIG. 13 shows an example of a wireless multimedia terminal according to the invention.

FIG. 13 illustrates the functional modules of an embodiment for a wireless multimedia terminal 1300 according to the invention. A Central Processing Unit 81 controls the blocks responsible for the mobile station's various functions: a Memory (MEM) 82, a Radio Frequency block (RF) 83, a User Interface (UI) 84 and an Interface Unit (IU) 85. The CPU is typically implemented with one or more functionally inter-working microprocessors. The memory preferably comprises a ROM (Read Only Memory), a RAM (Random Access Memory) and is generally supplemented with memory supplied with a SIM User Identification Module. In accordance with its program, the microprocessor uses the RF block 83 for transmitting and receiving signals on a radio path. Communication with the user is managed via the UI 84, which typically comprises a loudspeaker, a microphone, a display and a keyboard. The Interface Unit 85 provides a link to a data processing entity, and it is controlled by the CPU 81. The data processing entity may be e.g. an integrated data processor or external data processing equipment, such as a personal computer. The mobile terminal according to the invention also comprises at least one scalable encoder according to the invention; in FIG. 13 a scalable encoder 500 is shown. Typically a mobile terminal according to the invention also comprises a corresponding decoder. The mobile terminal also comprises a multiplexer 88 for generating a composite data-stream comprising the core and enhancement data-streams output by the scalable encoder and control information. It also generates decomposed data-streams for decoding from the received data-stream. The multiplexer is arranged to output the encoded multiplexed bit-streams into a multiplexer buffer 520. The scalable encoder 500 comprises control means, which is typically connected by a control data feedback loop to control the operations of the encoding processes and receives information about the occupancy level of the multiplexer buffer 520 as described in connection with FIG. 5. Although only two data-streams are presented in FIG. 13, more than two bit-streams (e.g. control data, data for data applications, etc. as shown in FIG. 12) can also be involved. A target bit-rate for each data stream is set according to, for example, the preference information received by the terminal, and a policy for making adjustments to those targets in case of multiplexer buffer overflow is defined, in a manner described earlier.

The input element 510 in a mobile terminal can be arranged to receive preference information through the user interface 84 as described in FIGS. 5 and 13. The input element 510 in a mobile terminal can also be arranged to receive preference information from the terminal, with which it is communicating, using control signals provided by the communication protocol used between the two terminal entities. The latest ITU-T (ITU Telecommunication Standardization Sector) videophone standards, such as ITU-T H.324 and H.323 use the H.245 control protocol to initialize a connection, i.e. open logical channels, exchange capability sets etc. This control protocol can also be used to send commands and indications during the connection, and these can be used to convey control information relating to the preferences of a receiving user/terminal to a transmitting terminal (see unit 510 in FIG. 12).

Although the invention has been illustrated and described in terms of a preferred embodiment, those persons of ordinary skill in the art will recognize modifications to the preferred embodiment may be made without departure from the scope of the invention as claimed below.

The invention claimed is:

1. Scalable encoder for encoding a media signal, said encoder comprising
   a core encoder for producing a first data stream, which is a core data stream relating to the media signal, having a first bit-rate,
   an enhancement encoder for producing a second data stream, which comprises at least one enhancement data stream relating to the media signal, said at least one enhancement data stream having a second bit-rate,
   a multiplexer for combining at least the first data stream and the second data stream into a third data stream, and
   a controller arranged to receive control information, to determine a target ratio of bitrates of the first data stream and the second data stream in the third data stream according to the control information and to adjust the combination of the first data stream and the second data stream in the third data stream by adjusting the first and the second bit-rates so as to maintain the ratio substantially constant.

2. A scalable encoder according to claim 1, wherein at least one of the core and enhancement encoders is a variable rate encoding means.

3. A scalable encoder according to claim 2, the controller having means for determining a target bit-rate at least for the data stream produced by said at least one of the core and enhancement encoders and is arranged to adjust the bit-rate of said data stream.

4. A scalable encoder according to claim 2, the controller further including a feedback loop, comparison means and a controller unit;
   said feedback loop arranged to transfer information on an estimated actual bit-rate of said data stream to the comparison means;
   said comparison means being supplied with a target bit-rate, arranged to calculate the difference between the estimated actual bit-rate of said data stream and target bit-rate and to provide the calculated difference to the controller unit;
   said controller being arranged to output a control signal to said at least one of the core and enhancement encoders, as a response to receiving said calculated difference; and
   said at least one of the core and enhancement encoders being arranged to adjust the bit-rate of said data stream according to the received control signal from the controller unit.

5. A scalable encoder according to claim 4, wherein said at least one of the core and enhancement encoders is arranged to adjust quantization of coefficients representing the media signal according to the control signal.

6. A scalable encoder according to claim 4, wherein said at least one of the core and enhancement encoders is a variable rate speech encoder.

7. A scalable encoder according to claim 4, wherein said at least one of the core and enhancement encoders is a variable rate audio encoder.

8. A scalable encoder according to claim 7, wherein the variable rate audio encoder is arranged to determine a bandwidth for the media signal according to the control signal.

9. A scalable encoder according to claim 1, wherein at least one of the core and enhancement encoders is a multi-rate encoding means having a set of available encoding algorithms.

10. A scalable encoder according to claim 9, the control means comprising means for determining a target bit-rate for at least the data stream produced by said at least one of the core and enhancement encoders, means for selecting an encoding algorithm among said set of encoding algorithms and for indicating said selected encoding algorithm to said at least one of the core and enhancement encoders, which is arranged to use the indicated encoding algorithm.

11. A scalable encoder according to claim 10, said means for selecting an encoding algorithm comprising rate determination means.

12. A scalable encoder according to claim 9, wherein said at least one of the core and enhancement encoders is a multi-rate speech encoder.

13. A scalable encoder according to claim 1, further comprising means for determining jointly a first target bit-rate for the first data stream and a second target bit-rate for the second data stream according to said control information.

14. A scalable encoder according to claim 13, further comprising a multiplexer buffer for storing data from the multiplexer for transmission, and in that said multiplexer buffer is connected to the controller for delivering control information indicating the occupancy level of said multiplexer buffer, said occupancy level indicating the current amount of data stored in the multiplexer buffer.

15. A scalable encoder according to claim 14, wherein the means for determining jointly a first target bit-rate for the first data stream and a second target bit-rate for the second data stream are arranged to adjust the target bit-rates so that the ratio of the target bit-rates is substantially constant as long as the occupancy level of the buffer is below a certain first threshold.

16. A scalable encoder according to claim 1, wherein the controller is arranged to receive control information indicating a preferred combination of the first and second data streams.

17. A scalable encoder according to claim 16, wherein said control information indicating a preferred combination of the first and second data streams is used to determine a preferred ratio of the target bit-rate of the first data stream and the target bit-rate of the second data stream.

18. A scalable encoder according to claim 1, further comprising decoding means for decoding said first data stream into a decoded signal, wherein said enhancement encoder is arranged to encode a difference signal, which is the difference between the media signal and the decoded signal, said enhancement encoder producing the second data stream having said second bit-rate.

19. A scalable encoder according to claim 18, wherein the core encoder is a speech encoder and the enhancement encoder is an audio encoder.

20. A scalable encoder according to claim 19, wherein the speech encoder is a multi-rate speech encoder and the audio encoder is a variable rate audio encoder.

21. A scalable encoder according to claim 19, wherein the speech encoder is a variable rate speech encoder and the audio encoder is a variable rate audio encoder.

22. A scalable encoder according to claim 1, wherein the core encoder is a base layer video encoding means and the enhancement encoder comprises at least one enhancement layer video encoding means.

23. A scalable encoder according to claim 1, further comprising
   third encoding means for producing a fourth data stream, which is a core data stream corresponding to a second media signal, having a fourth bit-rate, and fourth encoding means for producing a fifth data stream, which comprises a set of enhancement data streams corresponding to the second media signal, having a fifth bit-rate, wherein the multiplexer is arranged to combine at least the first, the second, the fourth and the fifth data streams into a third data stream, and the control means is arranged to determine a target combination of the first, the second, the fourth and the fifth data streams in the third data stream according to the control information and to adjust the combination of said data streams in the third data stream by affecting the first, the second, the fourth and the fifth bit-rates.

24. A multimedia terminal comprising a scalable encoder having a core encoder for producing a first data stream, which is a core data stream relating to the media signal, having a first bit-rate, enhancement encoder for producing a second data stream, which comprises a set of enhancement data stream relating to the media stream, said at least one enhancement data stream having a second bit-rate, and a multiplexer for combining at least the first data stream and the second data stream into a third data stream, and a controller arranged to receive control information, to determine a target ratio of bit rates of the first data stream and the second data stream in the third data stream according to the control information and to adjust the ratio of bit rates of the first data stream and the second data stream in the third data stream by adjusting the first and the second bit-rates so as to maintain the ratio substantially constant.

25. A multimedia terminal according to claim 24, further comprising an input element for inputting preference information indicating a preferred combination of the first data stream and the second data stream, said preference information being delivered as control information to the control means.

26. A multimedia terminal according to claim 25, wherein said input element constitutes a part of a user interface of the multimedia terminal.

27. A multimedia terminal according to claim 26, wherein the user interface comprises a slide switch.

28. A multimedia terminal according to claim 25, wherein said input element is arranged to receive external control information.

29. A multimedia terminal according to claim 28, wherein said input element is arranged to receive control information from a communication network.

30. A multimedia terminal according to claim 28, wherein said input element is arranged to receive control information from a second multimedia terminal.

31. A multimedia terminal according to claim 24, said multimedia terminal being a mobile station of a mobile communication network.

32. A multimedia terminal according to claim 24, said multimedia terminal being an H.324 multimedia terminal.

33. A method for scalable encoding of a media signal, said method comprising:

encoding the media signal into a first data stream, which is a core data stream corresponding to the media signal, having a first bit rate, encoding the media signal into a second data stream which comprises at least one enhancement data stream corresponding to the media signal, the at least one enhancement data stream having a second bit rate, multiplexing at least the first data stream and the second data stream into a third data stream, receiving control information, determining a target ratio of bit rates of the first data stream and the second data stream in the third data stream according to the control information, and adjusting the combination of the first data stream and the second data stream in the third data stream by adjusting the first and the second bit-rates so as to maintain the ratio substantially constant.

34. A method according to claim 33, further comprising the steps of:

determining according to the control information a preferred ratio for a target bit-rate of the first data stream and a target bit-rate of the second data stream, determining jointly said target bit-rates, feeding the third data stream into a buffer, and determining the occupancy level of the buffer, wherein, when the occupancy level of the buffer is below a certain first threshold ($T_2$), the ratio of said target bit-rates is substantially said preferred ratio.

35. A method according to claim 34, wherein, when the occupancy level of the buffer is below a certain second threshold ($T_1$), the target bit-rate for the first data stream is determined based on the content of the media signal.

* * * * *